June 13, 1967  F. PAPKE  3,324,763
PROJECTOR ADAPTED TO BE USED WITH MACHINE TOOLS
Filed Sept. 8, 1965  3 Sheets-Sheet 1

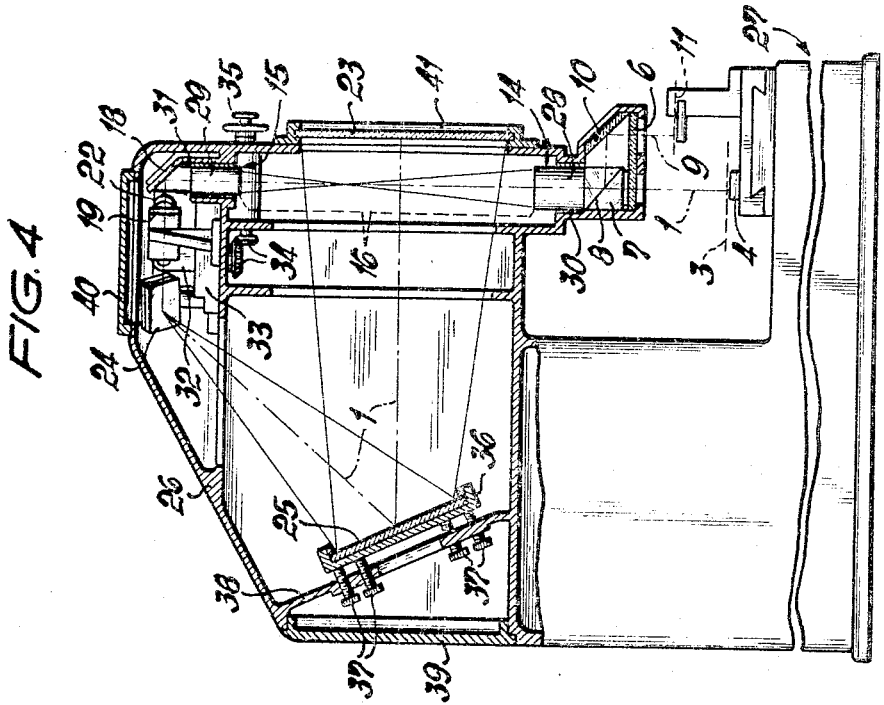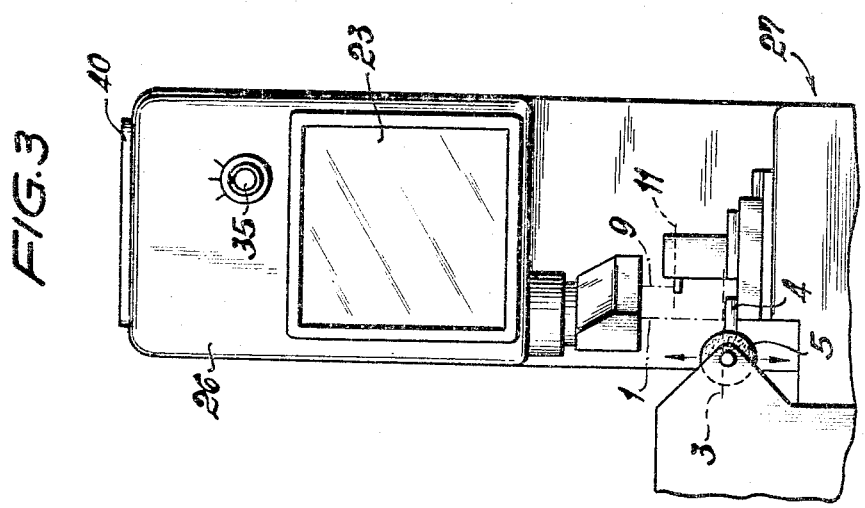

United States Patent Office 3,324,763
Patented June 13, 1967

3,324,763
PROJECTOR ADAPTED TO BE USED WITH
MACHINE TOOLS
Friedrich Papke, Braunschweig, Germany, assignor to
Voigtlander A.G., Braunschweig, Germany, a corporation of Germany
Filed Sept. 8, 1965, Ser. No. 485,732
Claims priority, application Germany, Feb. 26, 1965,
V 27,898
9 Claims. (Cl. 88—24)

ABSTRACT OF THE DISCLOSURE

A projector for providing an enlarged image of a given object and of the type which is adapted to be used with a machine tool for providing an enlarged image of at least part of a workpiece and a tool operating thereon. The projector includes a viewing screen on which the image is viewed, and this screen has a pair of opposed edges. An objective means is included in the projector for providing an intermediate image, and this objective means has a pair of mutually spaced sections respectively situated beyond the above opposed edges of the viewing screen, and these spaced sections of the objective means have a common optical axis which extends along a straight line having between the sections of the objective means a portion beside which the screen is situated. The projector also includes a means for directing the image to the screen along a path which crosses the common optical axis of the sections of the objective means which are respectively situated beyond the opposed edges of the viewing screen.

---

The present invention relates to projectors.

In particular, the present invention relates to that type of projector which is adapted to be used with a machine tool for providing an enlarged image of at least that part of a workpiece which is being machined together with the part of the tool which works thereon, so that extremely accurate machining can be carried out in this way. Quite often with such projectors there is provided on the viewing screen a guide formed by a suitable templet or the like indicating to the operator how to guide the tool and workpiece one relative to the other so as to provide an extremely accurate machining of the work from the enlarged image seen on the viewing screen of the projector.

Projectors of this type conventionally include interchangeable enlarging objectives of different focal lengths permitting the operator to select a degree of enlargement, and these enlarging objectives provide enlarged images of a real intermediate image of the work and tool whose combined image is projected. The objective means which provides the intermediate real image generally is made up of a pair of achromatic sections which are spaced from each other. The interchangeable enlarging objectives which receive the real intermediate image and enlarge the latter can, as is well known, be carried by a shiftable carriage or a rotary turret, so that in this way the operator can select a given enlarging objective which will provide the desired degree of enlargement. The guide for the movement of the tool and work, one relative to the other, is derived, for example, from a templet which can be placed directly on the viewing screen itself. While the workpiece is generally used itself to provide the image seen on the viewing screen, the tool can have its own image projected in some cases, but in other cases, a phantom image of the tool is projected onto the viewing screen.

Workpieces which are machined under the above conditions generally have been previously machined so that there surfaces are within a given range of the final dimensions which are to be achieved. In other words, the machine tool receives workpieces which within predetermined tolerances already have surfaces at least roughly approaching their final machine configuration. Thus, it is these surfaces which are to be finally machined to the final contour of the workpiece which are viewed on the viewing screen of the projector and which are compared with the edge of the templet or the like so as to guide the operator in the machining of the workpiece. In the case of a machine tool where the tool is reciprocated back and forth during the machining operations, as is the case, for example, with conventional grinding operations, it is only possible to provide a sharp image of the grinding edge of the grinding wheel when the grinding edge portion which engages the workpiece happens to be situated, during its back and forth movement, precisely in the focal plane of the objective means which provides the real intermediate image, or of course in the case of a machine tool where the tool remains in this plane, then there will be a steady sharp image thereof. If, however, instead of the tool itself a stationary phantom thereof is projected onto the viewing screen, then there is reliable sharp image of the contour of the tool provided at all times even in the case where the tool itself moves back and forth through the focal plane of the objective first toward this focal plane and then away from the latter.

With projectors of this type, which provide an intermediate real image from the objective, there is a relatively large distance between the elements which are imaged on the viewing screen and the first section of the objective means which provides the intermediate image. This arrangement is highly favorable from the standpoint that the first section of the objective means will in this way be exposed to a relatively small extent to dirt or other foreign matter in the vicinity of the machine tool, and of course there will be a smaller chance of damaging the structure either with the workpiece or the tool, or both, particularly by parts of the tool which are driven and are therefore in movement. Moreover, this latter arrangement makes it possible to use grinding wheels of relatively large diameter so that the grinding wheels are subject to relatively small wear. Moreover, the illumination of the parts which are to be imaged is brought about by a telecentric light beam, so that in this way during defocusing of the intermediate image, the image appearing on the viewing screen initially becomes only less sharp but does not change its size. However, in order to fulfill these latter requirements it is essential that the objective means which provides the intermediate image have directed toward the parts which are imaged a free opening which is at least as great as the size of the region which is to have its image projected. The size of this latter opening requires a relatively long distance between the back lenses of the sections of the intermediate imaging objective and the image, so that it is essential that the separate sections of the objective means have a relatively large space therebetween.

With known projectors of this type, in order to maintain the size of the entire assembly as well as its configuration within convenient proportions so that it will not occupy too much space and can be conveniently handled, it is conventional to deflect the optical axis at a portion thereof situated between the sections of the objecive means. Thus, it is conventional to situate between the pair of objectives a reflector which deflects the optical axis extending between the objective sections so that this latter portion of the optical axis does not extend along a sraight line. Thus, the two objective sections are mounted on the projector housing in such a way that they do not have a common mechanical axis extending along a straight line. Instead they are situated along axes which intersect at a predetermined angle. The precise manufacture of mountings on a projector housing for the lens-carriers of these objective sections is extremely difficult to carry out, and in fact a high degree of accuracy is impossible because of the angular relationship between the axes which pass through the pair of objective sections. Furthermore, the possibility of adjusting the sections relative to each other so that they can be precisely positioned is practically impossible to carry out with a high degree of accuracy. This is not only because the sections themselves are respectively situated along axes which intersect at a given angle, but in addition the reflector situated between these sections must also be adjusted, so that an extremely inconvenient structure of a low degree of accuracy necessarily results.

It is therefore a primary object of the present invention to avoid the above drawbacks by providing a projector of the above type which while remaining within the size and convenient configuration of conventional projectors nevertheless has the mountings for the pair of sections of the objective means which provides the real intermediate image situated in such a way that they can be easily and accurately manufactured and at the same time will permit an easy and highly accurate adjustment of the sections of the objective.

Furthermore, it is an object of the present invention to provide a projector structure which makes it possible to machine in the projector housing seats for the pair of sections of the objective without removing the projector housing from the machine tool and in a single operation with the same tool, so that with the highest possible degree of accuracy the pair of seats for the pair of objective sections will have a common mechanical access enabling the optical axis which extends between the pair of sections of the objective also to extend along a perfectly straight line.

Furthermore, it is an object of the present invention to provide a projector of the above type which is small enough to be conveniently situated at a part of the machine to where the operator can very easily view the images without making it difficult for the operator to manipulate the machine tool.

Also, the object of the present invention includes the provision of the projector of the above type which makes it possible to very conveniently and easily adjust the components of the projector while at the same time protecting these components from dust and other foreign matter which is commonly encountered in the vicinity of machine tools.

Primarily with the structure of the present invention, the objective means which provides the real image includes a pair of sections which are spaced from each other along a common optical axis which extends along a straight line at least at its portion which extends through and between the pair of sections of the objective means. In accordance with the present invention, the viewing screen is situated beside that part of the straight line which extends between the pair of objective sections so that these secions of the objective means are respectively situated beyond opposed edges of the viewing screen, and the image which is projected onto the viewing screen reaches the latter along a path which passes the straight line along which the optical axis of the pair of sections of the objective means extends.

The invention is illustrated by way of example in the accompanying drawings which form part of the application and in which:

FIG. 3 is a front elevation of the projector of the invention as it appears to the operator, FIG. 3 showing part of a machine tool on which the projector of the invention is mounted; and FIG. 4 is a partly sectional side elevation of the structure of FIG. 3 showing in greater detail an actual construction according to the present invention.

Figure 1:
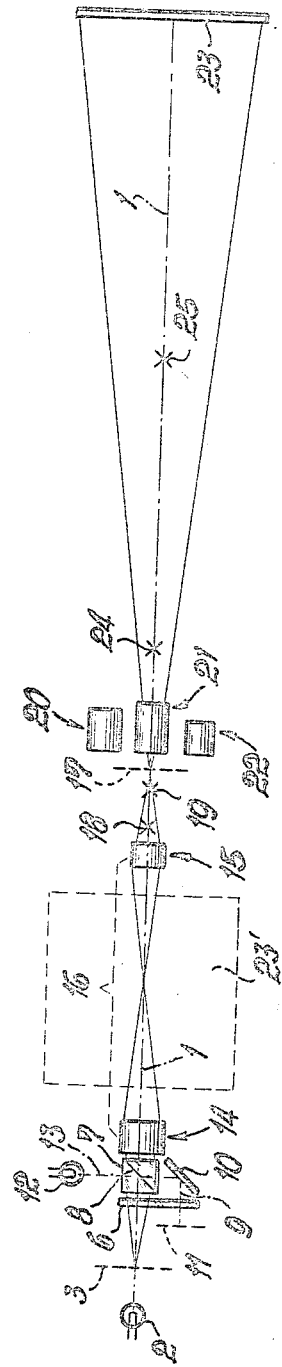
FIG. 1 is a schematic illustration of one possible embodiment of a projector according to the present invention, FIG. 1 showing the optical axis of the projector extending along a straight path, for the purpose of schematically indicating the successive parts of the projector which are arranged along this optical axis thereof.
Figure 2:
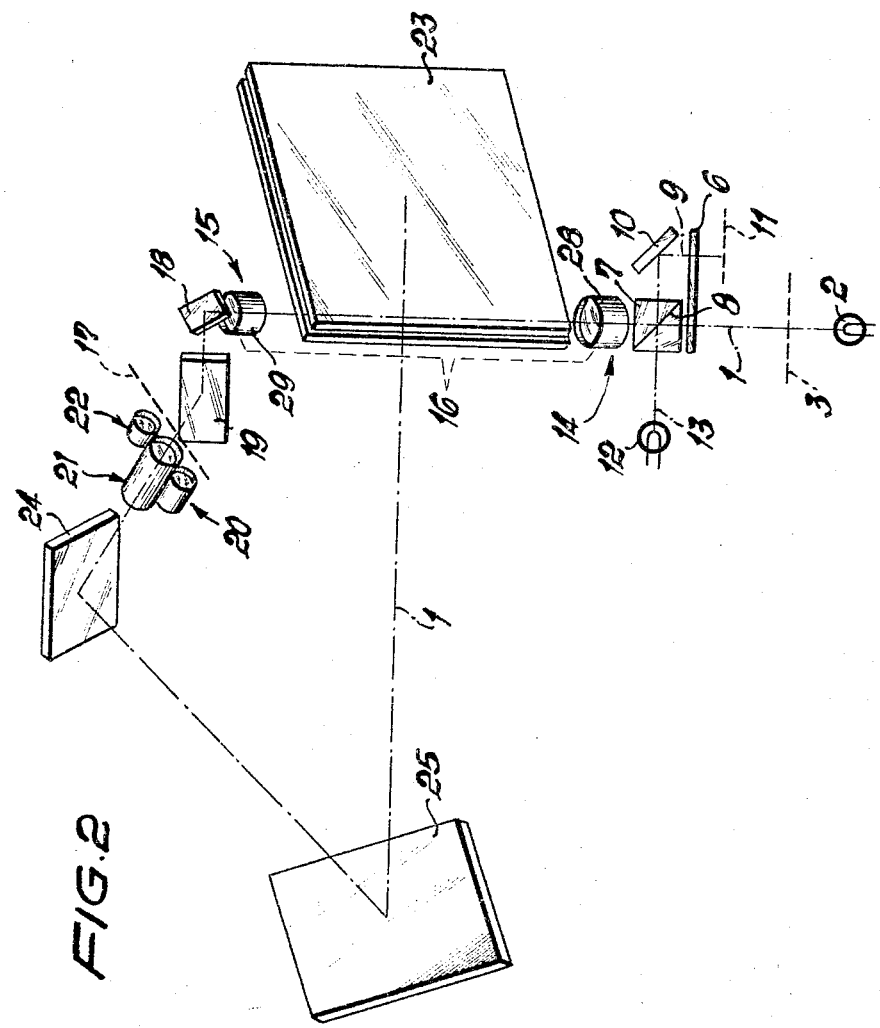
FIG. 2 is a schematic perspective illustration of the actual positioning of the various components of the projector of the invention relative to each other, FIG. 2 also schematically indicating the manner in which the light beam is directed along the optical axis for producing the desired image on the viewing screen.

The optical axis of the projector of the invention, along with the light beam thereof travels, is indicated by the dot-dash line 1. This optical axis 1 starts from the light source 2, in a through-lighting arrangement of the illumination, as indicated in FIGS. 1 and 2, and from the light source 2 the light will reach the working plane 3 indicated by a dotted line. In this working plane is situated, as indicated in FIG. 3, the workpiece 4 and the grinding wheel 5 which is the tool in the illustrated example. This tool 5 will reciprocate vertically back and forth as indicated by the arrows in FIG. 3. This tool 5 is in a known way supported on a carriage which is guided for up and down movement in the example of FIG. 3. The contours of the parts which are situated in the working plane 3 are projected onto the viewing screen with the structure described below, and there is situated at the viewing screen a guiding contour, formed, for example, by the edge of a suitable templet, so that in this way the operator can follow the guiding contour and provide the desired machined surface.

As may be seen from FIGS. 1, 2 and 4, there is situated along the path 1 of the light beam, subsequent to the working plane 3, a transparent protective plate 6 which is directed toward the location of the work and which is followed along the path of the light beam by a glass block 7 in which is embedded a partly transparent reflector 8 which in a known way serves to direct into the path 1 of the light beam a light beam 9 which reflects by way of the reflector 10 to the reflector 8, for movement along the path 1, an image of a phantom of the work tool, this phantom of the work tool being indicated by the dotted line 11.

Moreover, the partly transparent reflector 8 can also serve to illuminate the working plane 3 by directing light toward the working plane from a light source 12. Thus, this light source 12 will provide a light beam 13 which can be reflected by the semi-transparent reflector 8 toward the plane 3 for illuminating the latter, and while the pair of light sources 2 and 12 can be used simultaneously, as illustrated in FIG. 1, it is also possible to use them alternately so that when the light source 2 is used a through-lighting arrangement is provided while when the light source 12 is used illumination by directing light onto the plane 3 is provided. Of course, it is also possible to direct the light from the light source 2 along a roundabout path back to the semi-transparent reflector 8 to be directed by the latter toward the plane 3 so that in this case also the light source 2 can be used for illuminating the plane 3 by directing light toward the latter rather than by passing light therethrough.

Thus, the light beam which extends along the optical axis 1 and which travels from the plane 3, either from the source 2 or from the source 12, or both, will move through the semi-transparent reflector 8 to the objective means 16 which provides a real intermediate image 17 and which includes a pair of sections 14 and 15 which of course have a common optical axis formed by a part of the path 1, and in accordance with the present invention this part of the optical axis which is common to and passes through the sections 14 and 15 of the objective means 16 extends along a straight line. The working plane 3 is situated in the focal plane of objective means 16 so that at the plane indicated by the dotted line 17 there will be a real sharp image of the structure situated at the working plane 3. Along the portion of the path of the light beam which extends between the section 15 and the plane 17 are a pair of reflectors 18 and 19 which form part of a deflecting means for deflecting the light beam, and of course the optical axis, and these reflectors 18 and 19 are simply indicated by crosses in FIG. 1. The intermediate image plane 17 has a plurality of interchangeable enlarging objectives 20, 21, 22 so arranged with respect thereto that a selected one of these objectives can be placed with its optical axis situated along the path 1, to provide on the viewing screen 23 an image of the intermediate image at the plane 17 enlarged to a preselected degree, so that, practically speaking, the image of the parts situated at the working plane 3 is projected onto the viewing screen 23 with a selected degree of enlargement. The interchangeable objectives 20, 21, 22 will reproduce on the screen 23 either the entire real image at the plane 17 or only a part thereof. These interchangeable objectives 20, 21 and 22 have different focal lengths, respectively, so that in this way by selecting one of these objectives it is possible to provide at this screen 23 an image of a desired degree of enlargement. The degree of enlargement may be 10 to 100 times. The part of the optical axis or path 1 which extends between the interchangeable enlarging objectives 20–22 and the viewing screen 23 is deflected by additional reflectors 24 and 25 of the deflecting means, and these additional reflectors 24 and 25 are also indicated by crosses in FIG. 1.

The reflectors 18, 19, 24 and 25 which deflect the light beam extending along the optical axis 1 make it possible to provide an arrangement of the components of the projector within a relatively small housing 26, shown in FIGS. 3 and 4, and the construction and size of this housing 26 is such that it does not in any way detract from the convenience of the operations which are carried out at the machine tools 27. The operator of the machine tool can, without any appreciable change in the position of his body and head, observe directly and simultaneously both the location of the work itself where the operations are carried out as well as the screen 23 and the image thereon.

As is indicated in FIG. 4, the sections 14 and 15 of the objective means 16 include tubular holders 28 and 29 for the lenses of these sections, and these holders 28 and 29 are situated in suitable seats 30 and 31, respectively. It is to be noted that the location of these seats is such that pair of sections 14 and 15 are respectively situated beyond opposed side edges of the viewing screen 23, these being the upper and lower side edges of the viewing screen in the example illustrated in FIG. 4. Thus, the common optical axis of the sections 14 and 15 of the objective 16 extends along a straight line having between the objective sections 14 and 15 a part beside which the viewing screen 23 is situated. In fact, the seats 30 and 31 are respectively situated adjacent the opposed upper and lower edges of the viewing screen 23. Thus, the portion of the optical axis which extends between and through the sections 14 and 15 is not deflected in any way. It crosses the part of the light path 1 which extends from the reflector 25 to the viewing screen 23, so that the path of the light beam subsequent to the objective means 16 is directed by the deflecting means formed by the reflectors 18, 19, 24 and 25 back to the viewing screen 23 along a path which crosses a portion of the optical axis which extends between the sections 14 and 15. This arrangement is also apparent from FIG. 2. There is shown in FIG. 1 a dotted rectangle 23′ situated between the objective sections 14 and 15, so as to indicate where the viewing screen is actually situated, and it will be noted that while the optical axis 1 passes centrally across the viewing screen 23′ in FIG. 1 it is situated adjacent the left side edge thereof in FIG. 2, so that with the structure of the invention it is possible to arrange the path or optical axis 1 so that its portion which extends between the sections 14 and 15 of the objective 16 is situated midway between the vertical opposed side edges of the screen 23 or near to one of the other of these side edges.

Moreover, the drawings indicate a construction where the portion of the optical axis which extends between the sections 14 and 15 not only extends along a straight line but in addition is parallel to the plane in which the viewing screen 23 is situated. However, it is possible to situate the viewing screen in a plane which is inclined with respect to the portion of the optical axis which extends between the objective sections 14 and 15. Thus, the plane of the viewing screen 23 can have with respect to the optical axis at its portion which extends between the sections 14 and 15 an attitude other than one which is parallel to this latter portion of the optical axis.

The cylindrical seats 30 and 31 of the housing 26 have a common axis, so that the machining of the cylindrical surfaces on which the cylindrical lens-holders 28 and 29 are seated, is easy to carry out in a highly accurate manner, and in addition the adjustment of the lens-holding units 28 and 29 relative to each other along their common optical axis is extremely simple to carry out in a highly accurate manner.

As may be seen from FIG. 4, the carrier for the three enlarging objectives 20, 21, 22, of which only the objective 22 is visible, is formed by a carriage 32 which is adjustably supported on a suitable guide 33 and which can be driven through a bevel-gear drive 34 from a hand wheel 35, so that by turning the hand wheel 35 it is possible to select one of the enlarging objectives to provide an image of a desired degree of enlargment at the viewing screen 23.

The guides 33 for the carriage 32, as well as the holders for the reflectors 18, 19, 24 and 25 are arranged on interior intermediate walls or partitions of the housing 26, and these intermediate walls are in the form of rib-like strengthening portions of the housing 26. As a result, this housing is quite strong and is stiff enough to maintain its dimensions without any significant change even if considerable heat should develop in the interior of the housing 26.

As may be seen from FIG. 4, the reflector 25 is held by a suitable frame 36 which is supported by holding and adjusting screws 37 on the intermediate wall 38 of the housing 26. The housing has a removable cover portion 39 which renders the screws 37 accessible, so that in this way it is possible to adjust the position of the reflector 25. In a similar way it is possible to adjust the holders of the reflectors 18, 19 and 24 as well as the structure for carrying and adjusting the interchangeable and enlarging objectives 20, 21, 22, and for this purpose the housing 26 includes a removable upper cover 40. The viewing screen 23 is itself carried by a removable holding frame 41 which is releasably connected in any suitable way to the housing 26 so that after the frame 41 together with the screen 23 are removed the lens-holders 28 and 29 are freely accessible for adjusting purposes.

It is apparent that with the above-described structure of the invention, when the cylindrical seats 30 and 31 are machined in the housing 26, it is possible to allow the housing 26 to remain fixed on the machine tool and to machine both of the cylindrical surfaces 30 and 31 in a single operation without any change in the position of the housing 26 or the cutting tool, so that in this way the highest possible degree of accuracy for the sections 14 and 15 of the objective means 16 is guaranteed.

What is claimed is:

1. In a projector for providing an enlarged image of an object, a viewing screen on which said image is viewed, said screen having a pair of opposed edges, and objective means for providing an intermediate image, said objective means having a pair of mutually spaced sections respectively situated beyond said opposed edges of said viewing screen, and said sections of said objective means having a common optical axis extending along a straight line having between said sections a portion beside which said screen is situated.

2. In a projector as recited in claim 1, means for directing said image to said screen along a path which crosses said common optical axis of said sections of said objective means.

3. In a projector as recited in claim 1, said screen having between said opposed edges thereof a straight side edge which is parallel to said common optical axis of said sections of said objective means.

4. In a projector as recited in claim 1, said viewing screen being situated in a plane which is parallel to said straight line along which said common optical axis of said sections of said objective means extends.

5. In a projector as recited in claim 1, deflecting means situated beyond said objective means for deflecting said optical axis after it passes through both of said sections of said objective means along a path which returns to said screen while crossing over the portion of the optical axis which extends between said sections of said objective means.

6. In a projector as recited in claim 5, said deflecting means including a pair of reflectors spaced from each other, and said projector including a plurality of enlarging objectives of different focal length and a support means carrying said objectives for selectively situating one of them, which provides a selected degree of enlargement, along the optical axis between said pair of reflectors.

7. In a projector as recited in claim 1, housing means supporting said sections of said objective means for adjustable movement along their common optical axis.

8. In a projector for providing an enlarged image of an object, a viewing screen on which said image is viewed, said screen having a pair of opposed edges, objective means for providing an intermediate image, said objective means having a pair of sections respectively situated beyond said opposed edges of said viewing screen, and said sections of said objective means having a common optical axis extending along a straight line having between said sections a portion beside which said screen is situated, housing means supporting said sections of said objective means for adjustable movement along their common optical axis, and a frame carrying said screen and removably connected to said housing means so that upon removal of said frame and said screen therewith access may be had to said sections of said objective means for adjusting said sections.

9. In a projector as recited in claim 1, means for directing said image to said screen along a path which crosses said common optical axis of said sections of said objective means, and said screen having between said opposed edges thereof a straight side edge which is parallel to said common optical axis of said sections of said objective means, said viewing screen also being situated in a plane which is parallel to said straight line along which said common optical axis of said sections of said objective means extends.

References Cited
UNITED STATES PATENTS

| | | | |
|---|---|---|---|
| 1,794,147 | 2/1931 | Chidester | 88—24 |
| 2,214,376 | 9/1940 | Kurtz | 88—24 |
| 2,552,238 | 5/1951 | Turner et al. | 88—24 |
| 2,574,119 | 11/1951 | Mottu | 88—24 |
| 2,665,608 | 1/1954 | Clark | 88—24 |

NORTON ANSHER, *Primary Examiner.*

DAVID L. JACOBSON, *Assistant Examiner.*